United States Patent [19]
Hubbard

[11] Patent Number: 5,593,748
[45] Date of Patent: Jan. 14, 1997

[54] REINFORCED TAPE STRIP FOR PERIMETER SECUREMENT OF A MEMBRANE ROOF AND METHOD OF ATTACHING

[75] Inventor: Michael J. Hubbard, Holland, Ohio

[73] Assignee: GenCorp Inc., Fairlawn, Ohio

[21] Appl. No.: 353,735

[22] Filed: Dec. 12, 1994

Related U.S. Application Data

[63] Continuation of Ser. No. 193,320, Feb. 9, 1994, abandoned.

[51] Int. Cl.$^6$ .................................................. C09J 7/02
[52] U.S. Cl. .................. 428/41.3; 428/261; 428/343; 428/354
[58] Field of Search ...................... 428/40, 354, 355, 428/147, 57, 58, 517, 521, 261, 343; 52/58, 410, 746

[56] References Cited

U.S. PATENT DOCUMENTS

| | | | |
|---|---|---|---|
| 4,519,175 | 5/1985 | Resan | 52/713 |
| 4,588,637 | 5/1986 | Chiu | 428/521 X |
| 4,649,686 | 3/1987 | Backenstow et al. | 52/509 |
| 4,712,348 | 12/1987 | Triplett et al. | 52/408 |
| 4,767,653 | 8/1988 | Renstrom | 428/192 X |
| 4,885,887 | 12/1989 | Simmons et al. | 52/410 |
| 4,932,171 | 6/1990 | Beattie | 52/58 |
| 4,934,117 | 6/1990 | Barksdale | 52/219 |
| 4,965,119 | 10/1990 | Sancaktar | 428/354 X |
| 4,996,812 | 3/1991 | Venable | 428/148 X |
| 5,198,300 | 3/1993 | Matthews et al. | 428/57 X |
| 5,204,148 | 4/1993 | Alexander et al. | 428/40 |
| 5,286,798 | 2/1994 | Davis et al. | 428/290 X |

*Primary Examiner*—Jenna Davis
*Attorney, Agent, or Firm*—Robert F. Rywalski; Larry R. Meenan

[57] ABSTRACT

A reinforced tape strip for securing a membrane roof to a roof deck or a parapet wall of a roof deck. The reinforced tape strip includes a layer of a single ply reinforcement material, at least one adhesive layer of a uniform thickness bonded to the single ply reinforcement material, and a protective layer covering the adhesive layer.

16 Claims, 1 Drawing Sheet

REINFORCED TAPE STRIP FOR PERIMETER SECUREMENT OF A MEMBRANE ROOF AND METHOD OF ATTACHING

This application is a continuation of application Ser. No. 08/193,320, filed Feb. 9, 1994, now abandoned.

FIELD OF THE INVENTION

This invention relates to a reinforced tape strip. More particularly, this invention relates to a reinforced tape strip for perimeter securement of a membrane roof to a roof deck and a method of attaching.

BACKGROUND OF THE INVENTION

A roof system generally includes a roof deck which is considered the structural supporting surface of a building extending between the surrounding exterior walls of the building. The roof deck may be constructed from plywood, metal decking or concrete or any other suitable material. Depending upon the construction, the roof deck may extend over the surrounding exterior walls or the roof deck may stop short of the exterior walls thereby forming a parapet wall, i.e., a low retaining wall at the edge of the roof deck. If desired, the roof system may also include an insulation barrier formed from polyisocyanarate or any other suitable material applied over the roof deck.

To make the roof deck and building weather resistant a membrane roof is installed over the roof deck. The membrane roof refers to a water impermeable sheet of polymeric material such as ethylene propylene diene rubber (EPDM), chlorinated polyethylene, polyvinyl chloride, or chlorosulfanated polyethylene. The membrane roof has heretofore been installed on the roof deck using a variety of different methods.

For example, the field or interior of the membrane roof may be held to the roof deck by the use of ballast and/or penetrating or non-penetrating fastener means as known in the art. An example of a penetrating fastener means for retaining the field of a membrane roof installed to a roof deck is by utilizing a plurality of small, circular, metal plates having a hole in the center and a roofing screw or other suitable fastener. In order to anchor the membrane roof, the small, circular, metal plates are spaced apart in rows on the membrane roof and the fastener is driven through the hole in each plate, the membrane roof, any insulation material and then into the roof deck. The metal plates are then covered by overlapping roof membrane. An example of a non-penetrating fastener means would include totally adhering the field of the membrane roof to the roof deck.

However, because the wind uplift forces are not evenly distributed across the roof deck and the perimeter of the roof deck, particularly next to a parapet wall, encounters greater wind uplift forces than are encountered in the field, further consideration must be given to the installation of the membrane roof at the perimeter of the roof deck, e.g., at the parapet wall. Failure to adequately install the membrane roof to the roof deck at the perimeter could cause the membrane roof to separate from the roof deck and/or parapet wall resulting in roof failure and possible damage to the building structure and building interior.

One example of an apparatus for securing a membrane roof to a roof deck at the perimeter of the roof deck is disclosed in U.S. Pat. No. 4,932,171. U.S. Pat. No. 4,932,171 discloses an attachment strip consisting of an EPDM membrane which may or may not be fabric reinforced. The attachment strip is mechanically fastened to the roof deck by fasteners and then an adhesive layer is applied over the attachment strip. Additional adhesive is then applied against the extreme edge of the roof deck and the membrane roof. Next, the membrane roof is pressed against the attachment strip thereby adhesively securing the membrane roof to the attachment strip and to the roof deck.

A membrane roof has also been installed on a roof deck at the perimeter by an attachment strip as disclosed in U.S. Pat. No. 4,885,887. The attachment strip consists of a rubber material such as EPDM and successive layers of an optional primer, an adhesive and a protective layer. The attachment strip is fastened to the roof deck using a bar anchor and then the protective layer is removed exposing the adhesive layer. An optional primer is applied to the bottom surface of the membrane roof and then the membrane roof is pressed against the tape strip adhering the membrane roof to the attachment strip.

Although the many known variations for attaching a membrane roof to a roof deck have been proven to perform satisfactorily under certain conditions, further improvements on attaching a membrane roof to a roof deck are desired.

One object of the present invention is to provide a reinforced tape strip for installing a membrane roof to a roof deck that is simple and economical to manufacture. Another object of the present invention is to provide a method of securing the perimeter of a membrane roof as it abuts against the parapet wall in a manner which reduces labor and material costs but which does not decrease field performance. It is a further object of the present invention to secure the perimeter of a membrane roof using a mechanically fastened reinforced tape strip which is attached to either the parapet wall or to the roof deck at the foot of the parapet wall. The perimeter of the membrane is then adhered to this reinforced tape strip and to the parapet wall. Another object of the present invention is to provide a reinforced tape strip for installing a membrane roof to a roof deck that exhibits superior strength when compared to previous known attachment strips of an equivalent thickness. Yet another object of the present invention is to provide a reinforced tape strip for installing a membrane roof to a roof deck that is flexible and simple to use.

SUMMARY OF THE INVENTION

Briefly, according to this invention, there is provided a reinforced tape strip for securing a membrane roof to a roof deck or a parapet wall of a roof deck. The reinforced tape strip includes a layer of a single ply reinforcement material, at least one adhesive layer of a uniform thickness bonded to the single ply reinforcement material, and a protective layer covering the adhesive layer. The single ply reinforcement material may be a polyester, nylon, polypropylene and fiberglass material. In a preferred embodiment, the reinforcement layer is a woven polyester material having a thread thickness between 100 and 3000 denure and having a thread count of 10 threads per inch. The reinforcement layer may be formed adjacent a single adhesive layer or the reinforcement layer may be formed between two layers of adhesive. The adhesive layer may be an EPDM based polymer adhesive, butyl based polymer adhesive or a blend thereof.

The protective layer of the reinforced tape strip includes a release liner. The release liner includes a release paper faced with polyethylene having a silicone release coating or the release liner includes a release paper faced with polypropylene having a silicone release coating.

The reinforced tape strip may be used to attach a roofing membrane to a parapet wall and abutting roof deck. The reinforced tape strip is first fastened to either the base of the parapet wall or the roof deck at a foot of the parapet wall with a portion of the reinforced tape strip resting on the roof deck. Then a primer is applied to an undersurface of the roofing membrane. Next a protective layer is removed from the reinforced tape strip. The roofing membrane is then adhered to the adhesive layer thereby providing perimeter securement of the membrane without penetrating the membrane.

BRIEF DESCRIPTION OF THE DRAWINGS

Further features and other objects and advantages of this invention will become clear from the following detailed description made with reference to the drawings in which.

DESCRIPTION OF THE PREFERRED EMBODIMENTS

Figure 1:
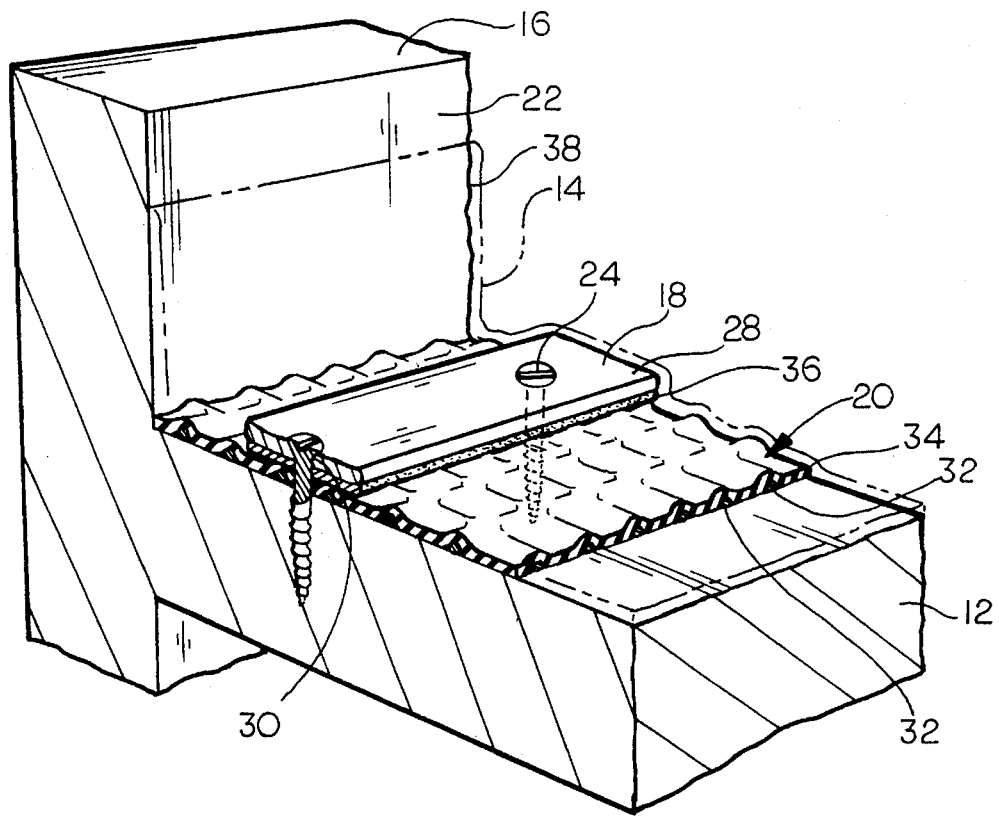
FIG. 1 is a perspective view partially in cross-section of a reinforced tape strip in accordance with the present invention using a batten bar securement device.

In the following description, like reference characters designate like or corresponding parts. Also, in the following description, it is to be understood that such terms as "forward", "rearward", "upward", "downward" and similar terms of position and direction are used for convenience in describing the invention as shown in the drawings.

Figure 2:
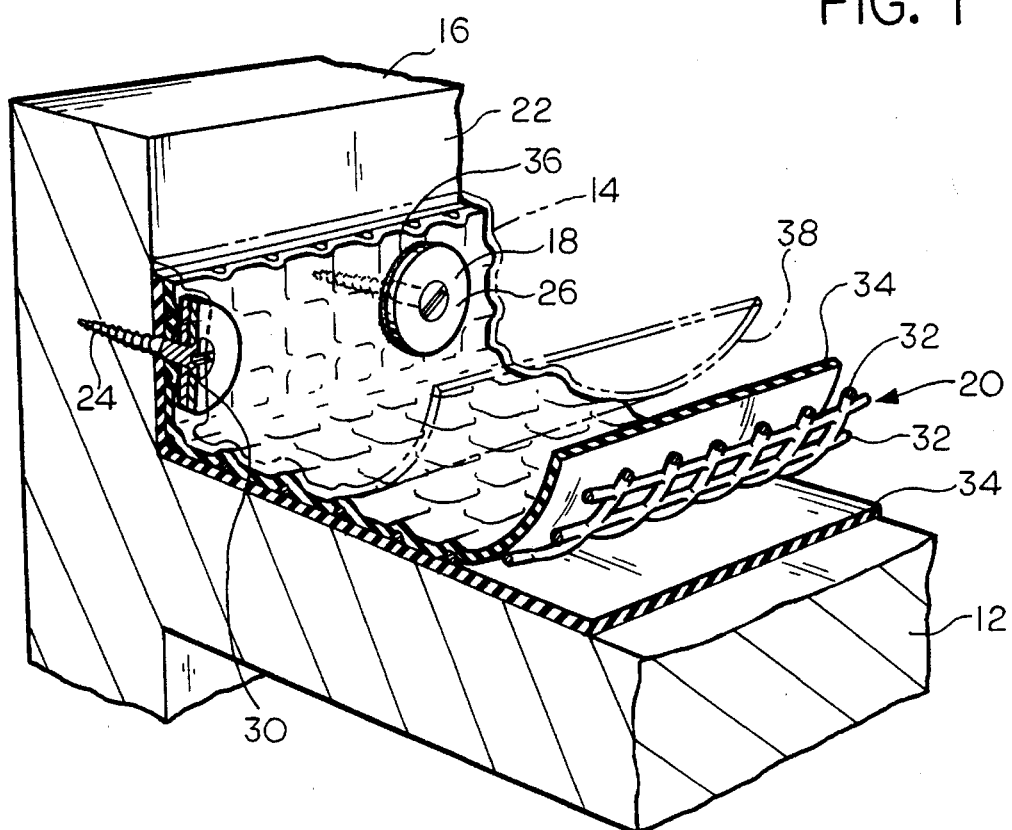
FIG. 2 is a perspective view partially in cross-section of a reinforced tape strip in accordance with the present invention using a seam disc securement device.

Referring now to FIGS. 1 and 2 there is shown a roof system 10 which includes a roof deck 12 which is covered by a single ply membrane roof 14. As known in the art insulation may be applied over the roof deck 12 as desired. Examples of suitable insulation materials include polyurethane, polystyrene, wood fiberboard, polyisocyanarate and the like. At a perimeter of the roof deck 12 is a parapet wall 16 which extends generally perpendicularly upward from the roof deck 12 above the plane of the roof deck.

The membrane roof 14 may be attached to the field (not shown) of the roof deck 12 using various devices throughout the extent of the roof deck. For a more complete description of different methods of attaching the field of a membrane roof to a roof deck reference is made to U.S. Pat. No. 4,649,686. The field portion of the membrane roof can, for example, be attached using ballast, i.e., gravel. The field portion of the membrane roof can also be attached using penetrating fasteners such as batten bars and non-penetrating fasteners such as those disclosed in U.S. Pat. No. 4,519,175. It will be appreciated from the foregoing that there are a variety of different non-penetrating fasteners and other fastening systems developed to attach the field portion of the roof membrane to the roof deck 12.

Referring to FIGS. 1 and 2, the perimeter of the membrane roof 14 is attached to the roof deck 12 through an anchor device 18 and a reinforced tape strip 20. The anchor device 18 secures the reinforced tape strip 20 in position either on the roof deck 12 or along the vertical side surface 22 of the parapet wall 16. Depending upon the location and function of the anchor device 18, the anchor device may include a plurality of conventional threaded fasteners 24 and seam discs 26 for securing the tape strip 20 to the vertical side surface 22 of the parapet wall 16, a plurality of conventional threaded fasteners and one or more batten bars 28 for securing the tape strip to the horizontal portion of the roof deck 12 or, if desired, a suitable combination of the foregoing. The threaded fasteners 24 of the anchor device 18 may be conventional screw fasteners of the type commercially available from Olympic Fasteners, ITW Buildex, SFS Stadler and Tru-Fast. Similarly, the batten bars 28 and seam discs 26 may also be of a conventional design and of the type commercially available from Olympic Fasteners, ITW Buildex, SFS Stadler, Tru-Fast and Talan Products Inc.

To install the anchor device 18, the anchor device 18 is placed on top of the reinforced tape strip 20 and the threaded fastener 24 is inserted into a hole 30 in the disc 26 or batten bar 28 and through the reinforced tape strip and into the roof deck 12 or parapet wall 16 such that the reinforced tape strip is securely fastened in a fixed position. The threaded fasteners 24 are generally installed in the roof deck 12 or parapet wall 16 at a spacing ranging form approximately every 6 inches to every 16 inches depending upon the wind uplift forces experienced by the membrane roof 14 at the perimeter. Under typical conditions, the preferred fastener 24 spacing is about every 12 inches regardless of the anchor device 18 used.

The reinforced tape strip 20 in accordance with the present invention includes a reinforcement layer 32 and one or more adhesive layers 34 and an optional protective layer 36. It will be appreciated that the thickness of the reinforced tape strip 20 may vary depending upon the thickness of the individual components of the tape strip. For example, the reinforced tape strip 20 may include a single adhesive layer 34 and a reinforcement layer 32 or the reinforced tape strip may include two adhesive layers 34 and an intermediate reinforcement layer 32. Moreover, the width of the reinforced tape strip 20 may also vary between about 5 and 18 inches depending upon installation conditions. In a preferred embodiment, the reinforced tape strip 20 is approximately 6 inches in width.

The adhesive layer 34 of the reinforced tape strip 20 is an EPDM or butyl based polymer adhesive or a blend thereof that is sufficiently cured to support immediate loads typically experienced at the perimeter of the building by the roof system 10. The adhesive layer 34 is 100 percent solids and could be utilized in thicknesses ranging from 0.015 inches to 0.060 inches. It is an important feature of the present invention that the adhesive layer 34 is of a uniform thickness and integral with the reinforcement layer 32. The preferred thickness of the adhesive layer 34 is 0.030 inches. The adhesive may be a commercially obtained adhesive such as an EPOM based polymer adhesive SP-303, SP-505 and SP-510 from ADCO Products Inc, and a butyl based polymer adhesive Plioseal 408 from Ashland Chemical.

The reinforcement layer 32 of the reinforced tape strip 20 is preferably a material of either polyester, nylon, polypropylene or fiberglass. The reinforcement layer 32 may be of a woven, non-woven or a composite type fabric. The thickness of the reinforcement layer 32 may range from about 0.006 to 0.026 inches thick. In the instance that the reinforcement layer is a woven fabric, the reinforcement layer preferably has a thread count ranging from approximately 5–30 threads per inch and a thread thickness of 1000 denure. In a most preferred embodiment, the reinforcement layer is a woven polyester material having a thread thickness between 100 and 3000 denure and having a thread count of 10 threads per inch. Suitable reinforcement layer materials may be obtained from JaMac Midwest Associates, BASF, Freudenburg Spunweb, Hoechst Celanese, PermaGlas-Mesh and John Boyle & Co., Inc. The reinforcement layer 32 may be sandwiched between two layers of adhesive 34 (FIG. 2) or the reinforcement layer may be adhered to one surface of the adhesive layer 34 (FIG. 1).

To ensure the adherence of the reinforced tape strip 20 it will be appreciated that the integrity of the adhesive layer 34 must be preserved during transport and installation of the tape strip. Accordingly, in a preferred embodiment, a protective layer 36 of a release liner covers the adhesive layer 34. The release liner may be either a release paper faced with either polyethylene or polypropylene and having a silicone release coating, a polyethylene film having a silicone release coating or a polypropylene film having a silicone release coating. The preferred release liner is a release paper having a thickness ranging from about 0.004 to about 0.011 inches. The preferred thickness of the release paper is about 0.007 inches. A suitable release paper may be obtained from Daubert Coated Products, Inc., James River Corporation and Release Technologies, Inc.

As shown in FIG. 1, the reinforced tape strip 20 is applied by placing the tape strip flat against the roof deck 12 with the length of the tape strip parallel with the lower edge of the parapet wall 16. The batten bar 28 is then positioned off-center upon the reinforced tape strip 20 such that the tape is divided longitudinally into two parallel lateral strips of material with more tape exposed toward the field of the roof to provide increased adhesion toward the field of the roof. Subsequently, threaded fasteners 24 are installed through holes 30 in the batten bar 28 and then through the reinforced tape strip 20 and into the roof deck 12. In this manner, the batten bar 28 anchors the reinforced tape strip 20 to the roof deck 12. Subsequently, the protective layer 36 is removed from the reinforced tape strip 20 to expose the adhesive layer 34. A primer 38 is then applied to the area of the bottom surface of the membrane roof 14 which overlaps the adhesive layer 34 of the reinforced tape strip 20. The primer 38 is applied at a coverage rate of 137 square feet per gallon. Suitable primers 38 include a synthetic polymer adhesive such as Royal 6396 from Uniroyal Adhesives, a butyl rubber base polymer such as HSSP-1 from ADCO Products Inc. and a butyl polymer base such as Pliobond® 9710, (a registered trademark of Ashland Oil, Inc.) and a synthetic base such as Plioseal 5637A from Ashland Chemical. The primer 38 may be applied by most any suitable means such as a brush or a roller.

Thereafter, the outer periphery of the membrane roof 14 is positioned across the reinforced tape strip 20 in an overlapping arrangement with the tape strip and pressed against the tape strip thereby securing the membrane roof to the roof deck 12. Additional adhesive may be applied to the vertical side surface 22 of the parapet wall 16 and surplus membrane roof 14 at the periphery continued up the parapet wall thereby providing a tight weather resistant bond. To assure contact between the underside of the membrane roof 14 and the adhesive layer 34 of the reinforced tape strip 20 the area of overlap may be rolled with a hand roller.

In an alternative installation as shown in FIG. 2, the reinforced tape strip 20 is applied by placing a portion of the tape strip flat against the roof deck 12 and the remaining portion turned upward along the vertical side surface 22 of the parapet wall 16 with the length of the tape strip parallel with the length of the parapet wall. Seam discs 26 of the type previously described are then positioned along the vertical side surface 22 of the parapet wall 16 and threaded fasteners 24 are inserted through holes 30 in the seam discs and then through the reinforced tape strip 20 and into the vertical side surface of the parapet wall. In this manner, the seam discs 26 anchor the reinforced tape strip 20 to the parapet wall 16. Subsequently the protective layer 36 is removed from the reinforced tape strip 20 to expose the adhesive layer 34. A primer 38 of the type previously described is then applied to the area of the bottom surface of the membrane roof 14 which overlaps the adhesive layer 34 of the reinforced tape strip 20. Thereafter, the outer periphery of the membrane roof 14 is positioned across the reinforced tape strip 20 in an overlapping arrangement with the tape strip thereby securing the membrane roof to the roof deck 12 and along the parapet wall 16. Additional adhesive may be applied to the vertical side surface 22 of the parapet wall 16 and surplus membrane roof 14 at the periphery and up the parapet wall thereby providing a weather resistant bond between the membrane roof and the parapet wall. As previously described, to assure contact between the underside of the membrane roof 14 and the adhesive layer 34 of the reinforced tape strip 20 the area of overlap may be rolled with a hand roller.

It will be appreciated from the foregoing that the reinforced tape strip 20 in accordance with the present invention may be used in cooperation with a variety of anchor devices 18 and at varying roof surface locations depending upon roof installation requirements and conditions.

The invention will be further clarified by a consideration of the following examples, which are intended to be purely exemplary of the use of the invention.

EXAMPLE 1

An approximately 6 inch wide by 14 inch long strip of Genflex EPDM rubber membrane roof material obtained from GenCorp Inc. of approximately 0.045 inches thickness was attached to a substrate material consisting of ½ inch thick plywood approximately 8 inches wide and 14 inches long intended to simulate a roof deck. The rubber membrane roof material was attached to the substrate material using a batten bar as previously described having a threaded fastener spacing of approximately 12 inches. No adhesive was applied between the EPDM rubber membrane roof and the substrate material.

The rubber membrane roof material was left undisturbed to age at 72 degrees fahrenheit temperature for approximately 3 days. An Instron tensile testing device having two separating jaw members was then used to measure the force required to separate the rubber membrane roof material from the substrate material at a temperature of 72 degrees fahrenheit. One jaw member was attached to the EPDM rubber membrane and the remaining jaw member was attached to the substrate material. The Instron was set at a rate of pull of about 2 inches per minute. The force required to separate the membrane roof from the substrate material in pounds force is provided in Table 1.

EXAMPLE 2

An approximately 6 inch wide by 14 inch long strip of Genflex EPDM rubber membrane roof material obtained from GenCorp Inc. of approximately 0.045 inches thickness was attached to a substrate material consisting of two pieces of ½ inch thick plywood approximately 8 inches wide and 14 inches long joined together to simulate a roof system including a roof deck and a parapet wall. The rubber membrane roof material was attached to the parapet wall of the substrate material using a batten bar as previously described having a threaded fastener spacing of approximately 12 inches. No adhesive was applied between the EPDM rubber membrane roof and the substrate material.

The rubber membrane roof material was left undisturbed to age at 72 degrees fahrenheit temperature for approximately 3 days. An Instron tensile testing device having two separating jaw members was then used to measure the force required to separate the rubber membrane roof material from the substrate material at a temperature of 72 degrees fahrenheit. One jaw member was attached to the EPDM rubber membrane and the remaining jaw member was attached to the substrate material. The Instron was set at a rate of pull of about 2 inches per minute. The force required to separate the membrane roof from the substrate material in pounds force is provided in Table 1.

EXAMPLES 3 AND 4

Two sample strips of Genflex EPDM rubber membrane roof material obtained from Gencorp. Inc. approximately 6 inches wide and 14 inches long having a thickness of 0.045 inches were attached to two separate substrate materials consisting of two pieces of plywood ½ inch thick and approximately 8 inches wide and 14 inches long joined together to simulate a roof system including a roof deck and a parapet wall. Each rubber membrane roof material was attached to the parapet wall of the substrate material by use of a Carlisle Russ Attachment Strip obtained from Carlisle Corporation. It is believed that the Carlisle Russ Attachment Strip is a reinforced polyester weft insert. The attachment strip was fastened top the substrate by the use of seam discs as previously described. The seam discs were secured with a threaded fastener spacing of approximately 12 inches. A splice adhesive, i.e., a butyl based adhesive, was then manually applied to the underside of the rubber membrane roof material and to the Carlisle Russ Attachment Strip. The membrane roof material was then pressed against the Carlisle Russ Attachment Strip after the splice adhesive dried sufficiently to adhere the membrane roof material to the attachment strip.

One rubber membrane roof material was left undisturbed to age at 72 degrees fahrenheit temperature for approximately 3 days and the other rubber membrane roof material was left undisturbed to age at 180 degrees fahrenheit temperature for approximately 14 days.

An Instron as described in Example 1 was used to measure the force required to separate the rubber membrane roof material which was left undisturbed for 3 days from the parapet wall substrate material. The Instron was set at a rate of pull of about 2 inches per minute. An Instron was also used to measure the force required to separate the rubber membrane roof material which was left undisturbed for 14 days from the parapet wall substrate material. The force required to separate the membrane roof after 3 days and after 14 days from the substrate material in pounds force is provided in Table 1.

EXAMPLES 5 AND 6

Two sample strips of Genflex EPDM rubber membrane roof material obtained from Gencorp Inc. approximately 6 inches wide and 14 inches long having a thickness of approximately 0.045 inches were attached to two separate substrate materials consisting of two pieces of ½ inch thick plywood 8 inches wide and 14 inches long intended to simulate a roof system including a roof deck and a parapet wall. Each rubber membrane roof material was attached to the parapet wall of the substrate material in accordance with the teachings of the present invention as shown in FIG. 1 using a reinforced tape strip and seam discs as previously described having a threaded fastener spacing of approximately 12 inches.

One rubber membrane roof material was left undisturbed to age at 72 degrees fahrenheit temperature for approximately 3 days and the other rubber membrane roof material was left undisturbed to age at 180 degrees fahrenheit temperature for approximately 14 days. An Instron as described in Example 1 was used to measure the force required to separate the rubber membrane roof material which was left undisturbed for 3 days from the parapet wall substrate material. The Instron was set at a rate of pull of about 2 inches per minute. An Instron was also used to measure the force required to separate the rubber membrane roof material which was left undisturbed for 14 days from the parapet wall substrate material. The force required to separate the membrane roof after 3 days and after 14 days from the substrate material in pounds force is provided in Table 1.

TABLE 1

| EXAMPLE | DAYS | AGING TEMP(°F.) | FORCE(lb) |
| --- | --- | --- | --- |
| 1- Bar anchor attached to roof deck | 3 | 72 | 54 |
| 2- Bar anchor attached to parapet wall | 3 | 72 | 98 |
| 3- Splice adhesive with seam discs attached to parapet wall | 3 | 72 | 209 |
| 4- Splice adhesive with seam discs attached to parapet wall | 14 | 180 | 240 |
| 5- Reinforced tape strip with seam discs attached to parapet wall | 3 | 72 | 211 |
| 6- Reinforced tape strip with seam discs attached to parapet wall | 14 | 180 | 267 |

As shown in Table 1, the membrane roof attached to a substrate material of Examples 5 and 6 which employed a reinforced tape strip in accordance with the present invention exhibited superior adhesion when compared to either Examples 1, 2, 3 and 4. It is believed that the reinforced tape strip of Examples 5 and 6 performed better than the method of attaching the roof membrane of Examples 1 and 2 because of the application of a continuous adhesive layer between the reinforcing layer and the substrate material. In addition, it is believed that the reinforced tape strip of Examples 5 and 6 performed better than the method of Examples 3 and 4 because the adhesive is integral with the reinforcement layer and applied as a substantially uniform layer as opposed to the manual adhesive application of Examples 3 and 4.

The documents, patents and patent applications referred to herein are hereby incorporated by reference.

Having described presently preferred embodiments of the invention, it is to be understood that it may be otherwise embodied within the scope of the appended claims.

What is claimed is:

1. A reinforced tape strip composite for securing a membrane roof to a roof deck or a parapet wall of a roof deck, the reinforced tape strip composite consisting essentially of:

a reinforcement layer consisting essentially of a single ply fabric reinforcement material;

at least one adhesive layer of a uniform thickness prebonded to said single ply fabric reinforcement material before the reinforced tape strip is fastened to the roof deck or the parapet wall, said at least one adhesive layer capable of being adhered to the membrane roof; and a protective layer covering said adhesive layer.

2. The reinforced tape strip of claim 1 wherein said single ply reinforcement material is selected from the group consisting of polyester, nylon, polypropylene and fiberglass.

3. The reinforced tape strip of claim 1 wherein said adhesive layer is selected from the group consisting of EPDM based polymer adhesive, butyl based polymer adhesive or a blend thereof.

4. The reinforced tape strip of claim 3 wherein said adhesive layer is of a thickness from 0.015 inches to 0.060 inches.

5. The reinforced tape strip of claim 3 wherein said adhesive layer is approximately 0.030 inches thick.

6. The reinforced tape strip of claim 3 wherein said reinforcement layer is of a woven fabric material.

7. The reinforced tape strip of claim 3 wherein said reinforcement layer is of a non-woven fabric material.

8. The reinforced tape strip of claim 3 wherein said reinforcement layer is of a composite formed of a non-woven fabric material and a woven fabric material.

9. The reinforced tape strip of claim 3 wherein said reinforcement layer has thickness ranging from about 0.006 to 0.026 inches.

10. The reinforced tape strip of claim 6 wherein said reinforcement layer is a woven fabric material having a thread count ranging from approximately 5–30 threads per inch and a thread thickness between 100 and 3000 denure.

11. The reinforced tape strip of claim 6 wherein said reinforcement layer is a woven polyester material having a thread thickness of 1000 denure and having a thread count of 10 threads per inch.

12. The reinforced tape strip of claim 10 wherein said reinforcement layer is positioned between two layers of adhesive.

13. The reinforced tape strip of claim 10 wherein said protective layer includes a release liner, said release liner comprising a release paper faced with polyethylene and having a silicone release coating.

14. The reinforced tape strip of claim 10 wherein said protective layer includes a release liner, said release liner comprising a release paper faced with polypropylene and having a silicone release coating.

15. The reinforced tape strip of claim 13 wherein said release liner comprises a release paper having a thickness ranging from about 0.004 to about 0.011 inches.

16. The reinforced tape strip of claim 13 wherein said release paper is about 0.007 inches thick.

\* \* \* \* \*